United States Patent [19]
Miki et al.

[11] 4,413,894
[45] Nov. 8, 1983

[54] INTERCHANGEABLE LENS AND CAMERA FOR USE THEREWITH

[75] Inventors: Yukio Miki, Sakai; Takeshi Egawa, Osaka, both of Japan

[73] Assignee: Minolta Camera Kabushiki Kaisha, Osaka, Japan

[21] Appl. No.: 392,326

[22] Filed: Jun. 25, 1982

[30] Foreign Application Priority Data
Jul. 3, 1981 [JP] Japan ............................ 56-104630
Jul. 9, 1981 [JP] Japan ............................ 56-107360

[51] Int. Cl.³ .................... G03B 3/00; G03B 17/00; G02B 7/11
[52] U.S. Cl. ................................ 354/195; 354/286; 350/255
[58] Field of Search ............... 354/25 R, 25 N, 195, 354/286; 350/255

[56] References Cited
U.S. PATENT DOCUMENTS
4,239,357 12/1980 Iida .................................. 354/25

FOREIGN PATENT DOCUMENTS
55-105407 7/1980 Japan .

Primary Examiner—William B. Perkey
Attorney, Agent, or Firm—Watson, Cole, Grindle & Watson

[57] ABSTRACT

An interchangeable lens for a camera is constructed such that as a lens shifting ring for focusing an optical system of the interchangeable lens is shifted to a position for manual focusing, a driven shaft for focusing retracts to be disengaged from a driving shaft inside a camera body with simultaneous connection of a means for transmission of driving force from the lens shifting ring to a lens shifting mechanism. This means for transmitting driving force from the lens shifting ring to the lens shifting mechanism is disconnected as the lens shifting ring is shifted to a position for automatic focusing with resultant engagement of the driven shaft with the driving shaft.

A camera is equipped with a detecting member which is shifted to an operating position as the driving shaft for driving the driven shaft of the mounted interchangeable lens is engaged with the driven shaft and a means for opening and closing an electric circuit for focusing according to shifting of the abovementioned detecting member.

13 Claims, 7 Drawing Figures

INTERCHANGEABLE LENS AND CAMERA FOR USE THEREWITH

BACKGROUND OF THE INVENTION

1. Technical Field of the Invention

The present invention relates generally to an interchangeable lens which is selectively capable of manual focusing and automatic focusing and a camera for use with such an interchangeable lens. More particularly it relates to an interchangeable lens barrel suited for a type of camera with a built-in motor for focusing whose power is transmitted over a driving shaft to a driven shaft on the interchangeable lens side for focusing an optical system, and a camera equipped therewith.

2. Description of the Prior Art

As an interchangeable lens which is selectively capable of manual focusing and automatic focusing is known by, for example, Japanese utility model laid-open publication Ser. No. Sho-55-105407. In the interchangeable lens disclosed therein there is provided immediately behind the objective lenses a rotary member (body) which rotates about an axis right across an optical axis for receiving a driving force from an automatic focusing mechanism on the camera body side. It is so arranged that a group of lenses for focusing is shifted along the optical axis, as the rotary member is rotated fore and back. Meanwhile, a lens shifting ring which is turned for manual focusing is correlated with a lens focusing mechanism by a clutch mechanism.

This clutch mechanism is so designed that the lens shifting ring for manual focusing is engaged with or disengaged from the lens shifting mechanism for focusing as the lens shifting ring is shifted between two positions on the lens barrel along the lens' optical axis.

With such an interchangeable lens, the lens shifting ring for manual focusing is set at one of the two positions (a first position) when focusing is done automatically. The lens shifting ring for manual focusing is now disengaged from the lens shifting mechanism for the load to be relieved so that automatic focusing operation by the automatic focusing mechanism on the camera body side can be done lightly. When the lens shifting ring is set at the other position (a second position) to thereby engage the lens shifting ring mechanically with the lens shifting mechanism for focusing for manual focusing, the abovementioned rotary member constituting a part of the driving force transmitting system for automatic focusing operation is kept pressed against the driving member on the camera body side, this giving rise to the following inconvenience. It is that when the lens shifting ring is turned for manual focusing, the driving mechanism and the motor on the camera body side for automatic focusing as well as the lens shifting mechanism are driven together so that the response is heavy and the desired light and quick manual focusing operation is interfered with.

Meanwhile, with such a camera it is desired to switch off the automatic focusing circuit when focusing is to be made manually and to have it switched on only when focusing is done automatically. There is, therefore, proposed a system (in e.g. U.S. Pat. No. 4,239,357) in which opening or closing of the abovementioned circuit is interlocked with selection of either of the two states on the interchangeable lens side, namely the state enabling manual focusing and the state enabling automatic focusing by the automatic focusing mechanism on the camera body side, so that opening and closing of such a circuit are done automatically according to manual-automatic change-over for focusing operation. In this system, however, the detecting member for detecting the state selected on the interchangeable lens side is located in a space specially provided in or in the vicinity of the camera body interchangeable lens barrel contact face (the so-called "mount face") and this gives rise to the following inconveniences.

First, there is little place to spare in the vicinity of the mount face of the camera body where iris controlling mechanism, iris information transmitting mechanism, etc. are incorporated. When, nevertheless, a camera is desired to be with a built-in mechanism for automatic focusing, it is necessary to provide the abovementioned detecting member in addition to the driving member for transmission of the output from the automatic focusing mechanism to the interchangeable lens side, this resulting in further limiting the spaces for the abovementioned members to be arranged on the mount face. Hence, according to the abovementioned system, the detecting member is to be located on the mount face together with the driving member, hence required is changing positions of other existing members, etc., and it means a drawback of the degree of freedom of design being affected rather badly.

SUMMARY OF THE INVENTION

It is an object of the present invention to provide an interchangeable lens with which the selection of means for automatic focusing and manual focusing can be made by a single step of manipulation and that focusing by either of the two means can be done smoothly and lightly.

Another object of the present invention is to provide a camera in which both a driving member for an automatic focusing mechanism and a detecting member for detecting the selected focusing operation mode on the interchangeable lens side are effectively arranged in an extremely small space.

Still another object of the present invention is to provide a camera equipped with a circuit opening and closing device by which a circuit for automatic focusing can be opened or closed automatically according to the selected focusing operation mode.

A further object of the present invention is to provide a camera and its interchangeable lens which are compact with an increased degree of freedom of design.

According to the present invention, there is provided an interchangeable lens, in which, as a lens shifting ring is shifted along the optical axis to a position for manual focusing, a driven shaft is caused to retract along the optical axis to be unclutched from a driving shaft on the camera body side and at the same time connected in a transmitting means for driving force for focusing from the lens shifting ring side to a lens shifting mechanism, while, when the lens shifting ring is shifted from the position for manual focusing to a position for automatic focusing along the optical axis, the driven shaft is moved along the optical axis into clutching with the driving shaft and at the same time disconnected is the transmitting means for driving force for focusing from the lens shifting ring side to the lens shifting mechanism.

Also, according to the present invention, there is provided a camera equipped with a driving device for focusing which drives the driven shaft of the interchangeable lens for automatically shifting the focusing lens group of the interchangeable lens barrel and further with an electric circuit for focusing, the driving shaft for driving the driven shaft of the interchangeable lens barrel, a detecting member which moves to the detecting position when the driven shaft is engaged with the driving shaft and an opening and closing means for the electric circuit for focusing which operates according to the movement of the detecting member.

In the interchangeable lens of the present invention, the driven shaft, which is interlocked with the lens shifting ring, is supported movable parallel to the optical axis, so that it can be engaged with or disengaged from the driving shaft in the camera body with the interchangeable lens mounted on the camera body. That is, the driven shaft is engageable with and disengageable from the driving shaft according to selection of the operation modes for automatic focusing and manual focusing.

Hence, the construction of the interchangeable lens can be simplified by the common use of the driven shaft as a clutch means for engaging with and disengaging from the driving shaft in the camera body, and a member.

Moreover, the focusing precision can be improved thereby for improved is the driving force transmission efficiency, reduced is the mechanical noise and also reduced is the play.

Further advantages and features of the present invention will become apparent from the following description of preferred embodiments of the invention.

DESCRIPTION OF THE PREFERRED EMBODIMENT

Figure 1:
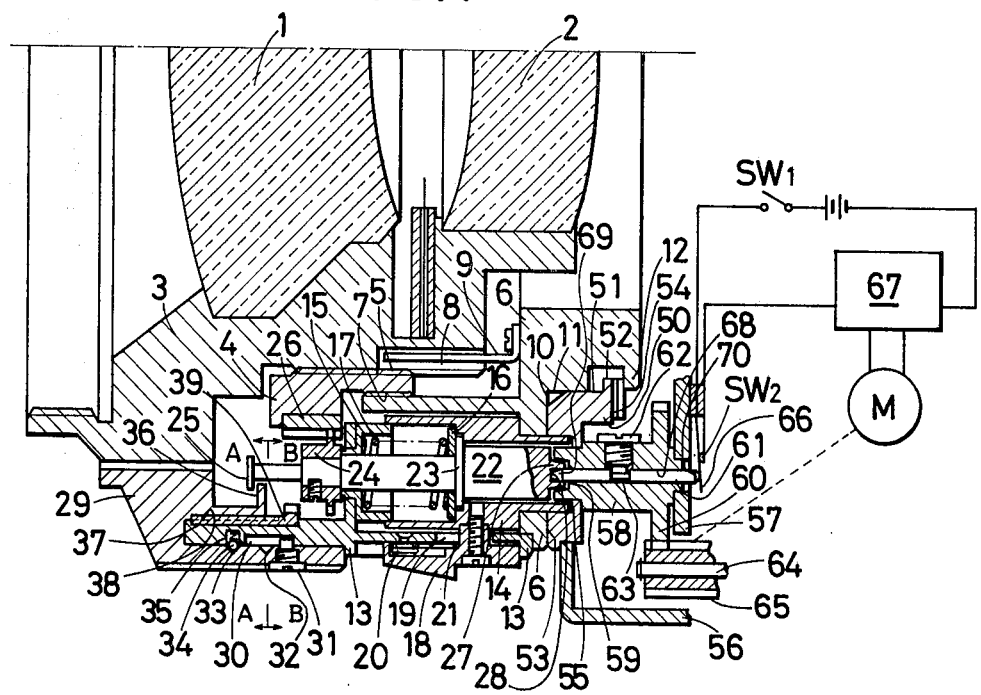
FIG. 1 is a sectional view of the essential parts of a preferred embodiment of the present invention, in which an interchangeable lens barrel is mounted on a camera body and is shown in the state of automatic focusing.

In all appended drawings reference numerals 1 and 2 denote an optical system for focusing and in this preferred embodiment it is also an optical system for photographing. The optical system for focusing 1 and 2 is held in a lens barrel 3, which is correlated with a rotary barrel 4 by helicoidal threads 5. A stationary barrel 6 is correlated with the rotary barrel 4 by helicoidal threads 7. In the lens barrel 3 there is formed a straight key way 8 along the optical axis and the straight shifting of the focusing optical system 1 and 2 along the optical axis is ensured by a key 9 fixed to the stationary barrel 6 engaged in the straight key way 8. The helicoidal threads 7, rotary barrel 4, helicoidal threads 5, straight key way 8 and key 9 constitute a straight forwarding mechanism or an optical system shifting mechanism. The stationary barrel 6 has in it an interchangeable mount face 10, an engaging outer peripheral surface 11 and bayonet pawls 12, which constitute a mounting device of a known interchangeable lens.

An outer barrel 13 is fixedly mounted on the stationary barrel 6. Reference numeral 14 denotes a cylindrical positioning member which determines the mounting position of the interchangeable lens on the camera body and is loosely engaged in the slit formed by a bearing 15 and the stationary barrel 6 to be movable along the optical axis. The front end of the positioning member 14 is engageable in and disengageable from a positioning recess 55 in the camera body to be described later. This positioning member 14 is urged by a helical compression spring 17 over a movable flange 16 in the projecting direction (to the right on the drawing). Reference numeral 18 denotes an actuating button, which runs through a slot 19 in the outer barrel 13 and is formed monoblock with the positioning member 14 to be movable therewith. Reference numeral 20 denotes a spring shaft fixedly secured to the outer barrel 13, which serves to hold a helical torsion bias spring 21, which urges the actuating button 18 hence also the positioning member 14 in the projecting direction (to the right on the drawing).

Reference numeral 22 denotes a driven shaft which has a flange 23 formed thereon. This flange 23 is provided for the driven shaft to receive the urging force of the helical compression spring 17 (thereby) and the outer stroke of the driven shaft 22 is limited according as the flange 23 comes in contact with the stepped portion of the positioning member. When the driven shaft 22 is at the outer limit of its stroke (Normally, as shown in FIG. 1, this is where clutching with a driving shaft 58 to be described later is completed.), this flange 23 is located between the movable flange 16 and the stepped portion of the positioning member 14. Moreover, the thickness of the flange 23 is dimensioned to be slightly less than the gap between the movable flange 16 and the stepped portion of the positioning member 14 along the optical axis, hence the driven shaft 22, when it is engaged with the driving shaft 58, can rotate smoothly free from the force of the spring 17. Reference numeral 24 denotes a gear fixedly set on the driven shaft 22 which is meshed with a gear 26 fixedly set on the rotary barrel 4. These gears 24 and 26 constitute a first transmission means for transmitting the driving force for focusing received by the driven shaft 22 to the above-mentioned optical system shifting mechanism (straight forwarding mechanism consisting of a helicoidal threads 7, rotary barrel 4, helicoidal thread 5, straight key way 8 and key 9).

The driven shaft 22 has its one end (left on the drawing) carried by the bearing 15 and the other end of it (right on the drawing) is engaged loosely with a proper play in a bore of the positioning member 14. This is for compensating the deviation of the axis of rotation resulting from the tolerances of the parts involved in mounting device for mounting the interchangeable lens on the camera body. Reference numeral 25 denotes a flange provided at the front end (left on the drawing) of the driven shaft 22. A clutching pawl 27 is provided so that according to the movement of the driven shaft 22 along the optical axis the rear end of the driven shaft 22 is engaged with and disengaged from the front end (left on the drawing) of the driving shaft 58 on the camera body side to be described later. This pawl 27 has in it a recess 28 to engage a detection pin 61 on the camera body side to be described later.

Reference numeral 29 denotes a lens shifting ring for manual focusing mounted on the outer barrel 13 to be rotatable and also shiftable along the optical axis. To describe in greater detail, 21 is a stopper pin fixedly secured to the lens shifting ring 29 and constitute stoppers to limit the position of the lens shifting ring 29 along the optical axis with both end faces of a peripheral groove 30 of the outer barrel 13. 32 and 33 are peripheral click stop grooves provided in the lens shifting ring 29 spaced in the direction of the optical axis and serve to define together the two alternative positions of the lens shifting ring 29 along the optical axis with a click stop ball 34 urged outwardly by a spring 35 carried by a part of the outer barrel 13. In the preferred embodiment, when the click stop groove 33 shown at the upper left on the drawing is engaging the clip stop ball 34 (See FIG. 1.), the lens shifting ring 29 is in the position for automatic focusing, and it is in the position for manual focusing when the clip stop groove 32 shown at the upper right on the drawing is engaging the clip stop ball 34 (See FIG. 2.).

36 is an inner peripheral flange of the lens shifting ring 29 and this flange is engaged with a flange 25 of the driven shaft 22 as the lens shifting ring 29 is shifted from the position for automatic focusing to the position for manual focusing (leftward on the drawing) and thereby causes the driven shaft 22 to retract. When the lens shifting ring 29 is at the position for automatic focusing, the said inner flange 36 is apart from the flange 25. 37 is a key way along the optical axis provided in the lens shifting ring 29 (See FIGS. 1, 2 and 3.). 39 is an internal gear mounted on the outer barrel 13 to be only rotatable and has formed on it a key 38 along the optical axis, which is engaged in the key way 37. As the key way 37 engages the key 38, the lens shifting ring 29 can be shifted only along the optical axis relatively to the outer barrel 13.

Meanwhile, the internal gear 39 is meshed with the gear 24 set on the driven shaft 22 fixedly when this shaft 22 is at a retracted position. The retracted position is meant the end of the stroke of the driven shaft 22 which is moved by the lens shifting ring 29 as this ring 22 is shifted to the position for manual focusing operation. In this preferred embodiment now described, the key way 37, key 38, internal gear 39, gear 24 and gear 26 constitute a second transmission means for transmitting the driving force for focusing resulting from the focusing manipulation of the lens shifting ring 29 to the optical system shifting mechanism.

In practice, the automatic focusing operation can be made lighter by applying a low-viscosity lubricating oil grease or a solid lubricant to the helicoidal threads 5. Smooth manual operation for focusing with a proper torque is attainable by applying a lubricating oil or grease of a proper viscosity between the outer barrel 13 and the lens shifting ring 29 loosely mounted on the outer barrel 13. A proper operation torque may also be attained by inserting a member for increasing friction such as a piece of polyacetal urged by a spring between the outer barrel 13 and the lens shifting ring 29 loosely mounted thereon.

The above is the setup of the interchangeable lens, and now described in the setup of the camera body.

Referring to FIGS. 1, 2 and 5, 50 is a lens mount, on which the interchangeable lens is mounted, and the mount arrangement of the camera body mating with the mount annular seat of the interchangeable lens is composed of an inner peripheral surface 51, bayonet pawls 52 and mount base surface 53. 54 is a leaf spring serving to bring the mount annular seat 10 of the interchangeable lens into close contact with the mount base surface 53 of the camera body. 55 is a positioning recess engaging the positioning member 14 of the interchangeable lens. 56 is a front wall plate of the camera body and 57 is a base plate.

58 is the driving shaft having formed at its front end (left on the drawing) a recess 59 as a clutching member to engage the pawl 27 of the driven shaft 22 of the interchangeable lens barrel, and having fixedly mounted a gear 60 on the rear end (right on the drawing) thereof. This driving shaft 58 is carried through the holes in the mount annular recess member 50 and the base plate 57 to be freely rotatable. 61 is a detection pin as a detecting member, which is loosely set through an axial through hole 68 of the driving shaft 58 and is constantly urged in the forward direction (to the left on the drawing) by the spring force of a movable contact 66 of a switch $SW_2$ provided as a circuit opening and closing means on the base plate 57. The detection pin 61 has formed amid it a small diameter groove 63 and is prevented from projecting too much or slipping off by a small screw 62 screwed in the provided hole in the driving shaft with its tip engaged in the small diameter groove 63.

The detection pin 61 is pressed by the bottom of a hole 28 in the driven shaft 22 as the driving shaft 58 is clutched with the driven shaft 22 to somewhat retract to the right on the drawing, and closes the switch $SW_2$ by one end 70 thereof. When the driving shaft 58 is unclutched from the driven shaft 22, the movable contact 66 with its restoration force (released) moves somewhat forward (to the left on the drawing) to open the switch $SW_2$. Thus, the detection pin 61 has a function to turn ON/OFF the switch $SW_2$ as the clutch is engaged and disengaged.

The detection member 61 has another function of improving the axial centering precision of the driving shaft 58 and the driven shaft 22 with the other end of it fitting in the hole 28 in the pawl 27 of the driven shaft 22. By this is accomplished effective transmission of driving force under elimination of axial centering error.

64 is a gear shaft secured to a stationary part of the camera body and has set on it a gear 65 which is meshed with the gear 60. This gear 64 is connected with a motor M over a driving force transmission mechanism (outline of which is shown in FIG. 1 in broken line). $SW_1$ is a switch for driving the motor, which is turned ON/OFF interlocked with e.g. a shutter release button. 67 is a motor drive control circuit, which receives the measured data from a focusing detecting circuit (not shown) and drives the motor M accordingly, calculating the required direction and extent of rotation thereof.

Figure 6:
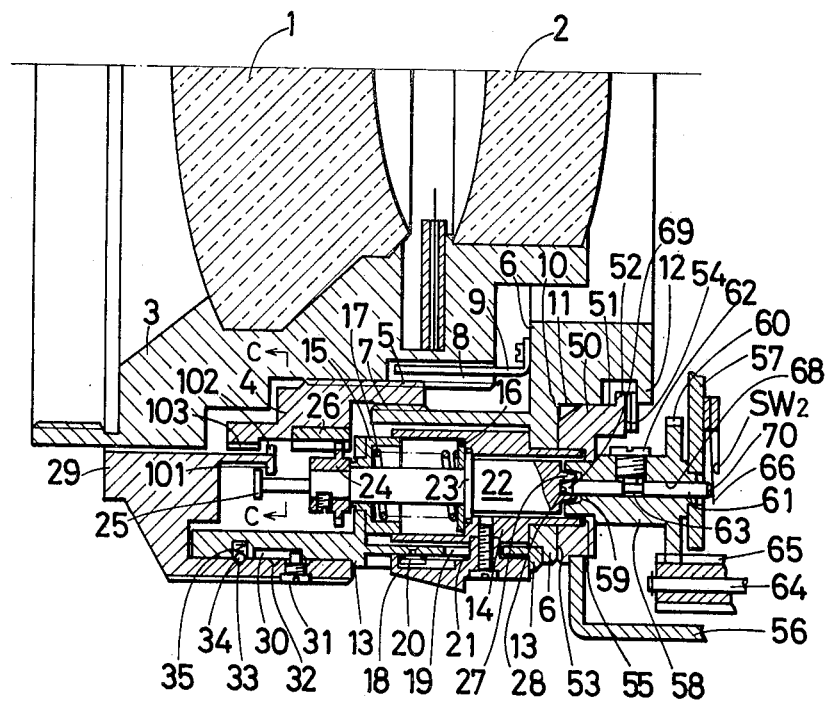
FIG. 6 is a sectional view of the essential parts of another preferred embodiment of the present invention, in which the interchangeable lens barrel is mounted on the camera body and is shown in the state of automatic focusing.
Figure 7:
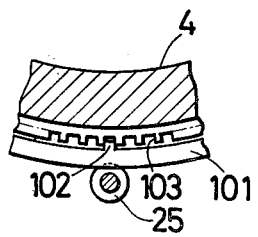
FIG. 7 is a sectional view taken along the line C—C of FIG. 6.

A second preferred embodiment is shown in FIGS. 6 and 7, in which like members and parts or those identical in function are referred to by the same numerals as in the first embodiment.

This is an embodiment in which the driving force required for manual focusing is transmitted from the lens shifting ring 20 directly to the optical system shifting mechanism not over the gear 24 on the driven shaft 22. 101 is an outer peripheral flange on the lens shifting ring 29 and plays a role similar to that of the inner peripheral flange 36 of the lens shifting ring 29 in the first embodiment. The outer peripheral flange 101 is engaged with a peripheral flange 25 of the driven shaft 22 as the lens shifting ring 29 is shifted from the position for automatic focusing to the position for manual focusing (to the upper left in FIG. 6), so that the flange 101 pushes the flange 36 to the left on the drawing and causes the driven shaft 22 to retract. When the lens shifting ring 29 is at the position for automatic focusing, that is, when the click stop ball 34 is engaged in the click stop groove 33, the said outer peripheral flange 101 is apart from the peripheral flange 25.

102 is a key formed to project inwardly from the lens shifting ring 29 and this key 102 is engaged in or disengaged from a key way 103 in the outer peripheral surface of the rotary barrel 4 as the lens shifting ring 29 is shifted along the optical axis (See FIG. 7.). The key way 103 is provided in the entire periphery. The key 102 and the key way 103 are engaged when the lens shifting ring 29 is at the position for manual focusing and are disengaged when the lens shifting ring 29 is at the position for automatic focusing.

Then described is how the system works. FIG. 1 shows the first embodiment in the state for automatic focusing. In FIG. 1, the lens shifting ring 29 is shifted at the position for automatic focusing. The click stop ball 34 is engaged in the clip stop groove 33, and the drive shaft 22 is engaged with the driving shaft 58 by means of the clutch mechanism including the pawl 27 and the recess 59. The detection pin 61 loosely set through the through hole 68 of the driving shaft 58 is pushed by the bottom of the hole 28 in the driven shaft 22 to close the switch SW$_2$ over the movable contact 66.

When the motor drive control circuit 67 is actuated following the instructions from the focusing detecting circuit (not shown) and the motor M is started, the gear 65 starts rotating as well as the gear 60 meshed therewith and the driving shaft 58. The torque is transmitted to the driven shaft 22 of the interchangeable lens barrel over the clutch mechanism 27 and 59 and the rotary barrel 4 is caused to rotate over the gears 24 and 26. As the rotary barrel 4 rotates, the said optical system shifting mechanism and straight forwarding mechanism 4, 5, 7, 8 and 9 shifts the focusing optical systems 1 and 2. When the optical systems 1 and 2 have been focused, the motor M is stopped by the motor drive control circuit 67 as it is instructed by the focusing detecting circuit. In the state for automatic focusing, the members and parts related with the lens shifting ring 29 as it is used for manual focusing such as the inner peripheral flange 36 and the internal gear 39 are disengaged from the mating members and parts involved in the automatic focusing operation, hence the lens shifting ring 29 does not rotate during the automatic focusing operation, and automatic focusing proceeds smoothly and lightly. Even if the lens shifting ring 29 is turned inadvertently then, it does not affect the automatic focusing operation even in the least.

Figure 5:
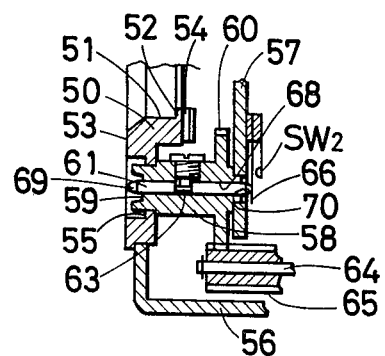
FIG. 5 is a sectional view of the camera body with the interchangeable lens barrel demounted.

In demounting the interchangeable lens from the camera body, first the actuating button 18 is to be shifted to the left on the drawing against the forces of the spring 17 and the torsion bias spring 21. With it the positioning member 14 and the driven shaft 22 are shifted in the same direction by the same extent and the engagement of the said member 14 with the positioning recess 55 and the clutch engagement of the pawl 27 of the driven shaft 22 with the recess 59 of the driving shaft 58 are both released, hence the interchangeable lens can then be demounted easily by simply turning it around the optical axis to disengage the bayonet pawls 52 from the bayonet pawls 12. The state of the camera body with the interchangeable lens demounted is as shown in FIG. 5, with the detection pin 61 kept at the foremost position by the spring force of the movable contact 66 of the switch SW$_2$, the switch SW$_2$ kept open and the motor drive control circuit 67 out of operation.

Then described is the manual focusing procedure (operation). First the lens shifting ring 29 at the position for automatic focusing as it is shown in FIG. 1 is pulled to the left on the drawing against the click stop action of the ball 34 and the click stop groove. As the lens shifting ring 29 is shifted to the position for manual focusing shown in FIG. 2, the click stop ball 34 is engaged in the click stop groove 32 and it is now ready for manual focusing by turning the lens shifting ring 29. As the lens shifting ring 29 is shifted to the left, the inner peripheral flange 36 pushes the flange 25 of the driven shaft 22 in the same direction, hence the clutch engagement of the recess 59 of the driving shaft 58 and the pawl 27 of the driven shaft 22 is released. At the same time the detection pin 61 is freed as its tip 69 detaches from the bottom of the hole 28 in the pawl 27 of the driven shaft 22, hence the movable contact 66 with its spring restoration force causes the detection pin 61 shift to the upper left on the drawing, at the same time opening the switch SW$_2$ and turning off the motor drive control circuit 67.

Figure 2:
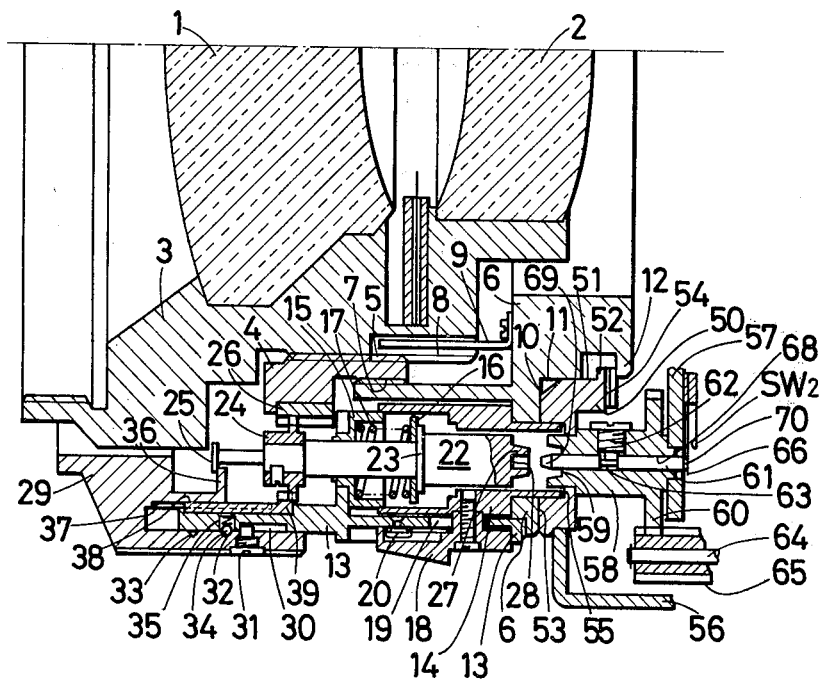
FIG. 2 is another sectional view of the essential parts of the embodiment of FIG. 1, in which the interchangeable lens barrel is shown in the state of manual focusing.
Figure 3:
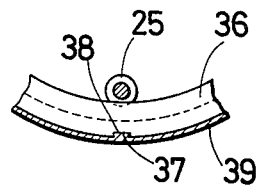
FIG. 3 is a sectional view taken along the line A—A of FIG. 1.
Figure 4:
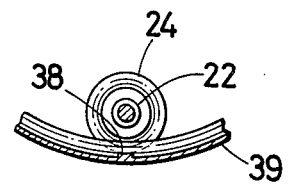
FIG. 4 is a sectional view taken along the line B—B of FIG. 1.

Meanwhile, as the lens shifting ring 29 is shifted to the left, the gear 24 is shifted also to the left together with the driven shaft 22 to be meshed with the internal gear 39 (FIG. 2).

When the lens shifting ring 29 is then turned, the torque is transmitted to the internal gear 39 as the key 38 is now engaged in the key way 37, and then further to the straight forwarding mechanism 4, 5, 7, 8 and 9 over the meshed gears 39 and 24, which then shifts the focusing optical system 1 and 2 for focusing. Since the driving shaft 58 of the camera body side is then disengaged from the driven shaft 22, there is no possibility of any member on the camera body side being driven by the torque transmitted within the interchangeable lens side. Hence, the manual focusing operation can be done very smoothly with no cause for generation of noise from the driving mechanism on the camera body side. With the clutch 27 and 59 disengaged, there is, of course, no necessity of selecting the speed reducing method adopted into the camera body side. Meanwhile, the engagement of the positioning member 14 in the positioning recess 55 is ensured by the bias spring 21.

In the embodiments described above the positioning member 14 is on the interchangeable lens side but it is also possible to have the positioning recess on the interchangeable lens side and provide the positioning pin 14, its actuating button 18 and the torsion bias spring 21 on the camera body side.

Also, both embodiments have the driving force transmission member 58 and the detecting member 61 included in the mount positioning means 55 on the camera body side, but it is also possible to arrange them in the vicinities of but separate from the mount positioning means 55.

Further, it is possible to differentiate the available interchangeable lenses by the depth of the hole 28 in the driven shaft 22 to identify their types and features such as minimum F number or focal distance so that the corresponding signals can be utilized on the camera body side. In such cases an extent-of-shift magnifying lever engageable with the rear end 70 of the detection pin 61 may be provided instead of the switch SW$_2$ in the embodiments shown and the other end of the said lever may be formed as a movable electrode, this correlated with e.g. digital code pattern provided on some other stationary member.

Referring now to FIGS. 6 and 7, described are these features in still another embodiment.

This embodiment differes only in the way of transmitting the driving force for focusing to the straight forwarding mechanism 4, 5, 7, 8 and 9, being the same otherwise as the first embodiment above. That is, when the lens shifting ring 29 is shifted from the position for automatic focusing to that for manual focusing, the driven shaft 22, too, is shifted to the left on the drawing to disengage the pawl 27 from the recess 59 and simultaneously the key 102 of the lens shifting ring 29 is engaged in the key way 103 of the rotary barrel 4 to enable manual focusing. Now the driving force for focusing resulting from manual turning of the lens shifting ring 29 is transmitted directly to the straight forwarding mechanism 4, 5, 7, 8 and 9. Other features such as the torque resulting from the manual focusing operation being not transmitted to the camera body and the switch $SW_2$ being then opened are the same as in the first embodiment.

While in the first and the second embodiments the positioning member 14 is on the interchangeable lens side, it is also possible to have the positioning recess 55 provided on the interchangeable lens side and provide the positioning member 14, its actuating button 18 and the torsion bias spring 21 on the camera body side. And in such a case it is further possible to provide two flanges 25 on both sides of the inner peripheral flange 36 to thereby dispense with the movable flange 16 and the spring 17.

Also, while in the embodiments described above the driving force transmitting member 22 is shown included in the positioning member 14, it is also possible to locate the driving force transmitting member 22 in the vicinity of but separate from the positioning member 14. In this case, the driving member 58 is also located in the vicinity of but separate from the positioning recess 55.

Further, in the embodiments above the gear 24 is shown meshed directly with the gear 26, but it is also possible to connect them over e.g. a train of gears for changing the rotary speed ratio or the direction of rotation according to the characteristics of the individual interchangeable lenses or over power-relaying members of various kinds when there is an increased distance between the mount means and the focusing optical system shifting mechanism.

While in the embodiments shown gears, key and key way are used for transmission of the torque for focusing, friction-type of transmission may as well be employed. Further, it is also possible to differentiate the available interchangeable lenses by the depth of the hole 28 in the driven shaft 22 to identify their types and features such as minimum F number or focal distance so that the corresponding signals can be utilized on the camera body side.

Still further, while a straight forwarding mechanism is shown as an example of optical system shifting mechanism, it is as well possible to take the rotary forwarding mechanisms now often used for zoom lenses, the means of focusing through adjustment of the position of the rear lens of an optical system by turning a cam barrel, etc.

While in the above embodiments the gear 24 on the driven shaft 22 side and the gear 26 on the rotary barrel side constituting the first transmission means are constantly meshed, it means in the second embodiment the second transmission means 102 and 103 are directly connected with the lens shifting ring 29 as well as with the optical system shifting mechanism 4, 5, 7, 8 and 9, hence it may be so arranged that the first transmission means 24 and 26 is engaged and disengaged synchronously with engagement and disengagement of the clutch mechanism 27 and 59. In this case the driven shaft 22 does not rotate at the time of manual focusing and the feeling of manual focusing operation is that much lighter.

According to the present invention relating to the driven shaft with its clutch mechanism for engagement with and disengagement from the driving shaft on the camera body side along the optical axis, the first transmission means for transmitting the driving force for focusing received by the said driven shaft to the optical system shifting mechanism, the lens shifting ring for manual focusing and the second transmission means for transmitting the driving force for focusing resulting from focusing operation with the said lens shifting ring, it is so arranged that either at least the former of the clutch mechanism and the first transmission means or the said second transmission means is engaged or disengaged as the lens shifting ring is shifted along the optical axis, hence, when it is ready for automatic focusing, the members on the lens shifting ring side are completely disengaged from those on both optical system shifting mechanism and the driven shaft sides and, therefore, the automatic focusing operation can proceed lighter and more smoothly with less driving energy. Further, when it is set for manual focusing, at least the engagement with the driving shaft on the camera body side is released, hence the manual focusing operation can be done smoothly with no cause for generation of noise on the camera body side. Moreover, the change-over between the manual focusing and the automatic focusing can be done by simple shifting of the lens shifting ring along the optical axis and the clutch mechanism is engaged or disengaged (for on/off of the transmission of driving force along the optical axis) simultaneously, hence it is extremely easy to operate and dependable, being thus useful for miniaturization of camera.

Meanwhile, according to the present invention, the camera body equipped with the driving shaft for transmission of the driving force for focusing to the interchangeable lens side for operation of the optical system shifting mechanism is provided with another driving shaft with its axis of rotation along the optical axis, the detecting member loosely set through the axial throughhole in the said driving shaft and the circuit opening and closing means which operates in response to axial shifting of the said detecting member accompanying mounting or demounting of the interchangeable lens, hence the circuit is automatically opened or closed according to the condition of the interchangeable lens.

Especially beneficial is the arrangement of the detecting member through the inside of the driving shaft, hence the present invention is useful for realizing a miniaturized (compact) camera featuring an improved driving mechanism for focusing with less space of the lens mount.

What is claimed is:

1. An interchangeable lens for mounting on a camera body equipped with a focusing device including a driving shaft for shifting at least one lens of an objective of the interchangeable lens automatically to the in-focus position, including:

a lens shifting mechanism for shifting at least one lens along the optical axis;

a driven shaft carried to be shiftable parallel to the optical axis between an engaging position and a disengaging position so that it can be either engaged with or disengaged from the driving shaft of the camera body when the interchangeable lens is mounted on the camera body; said driven shaft being also arranged so that it is disengaged from the driving shaft of the camera body when the interchangeable lens is demounted from the camera body;

a driving force transmission mechanism for transmitting the torque produced by rotation of said driven shaft to said lens shifting mechanism;

a lens shifting member for focusing working in response to manual operation;

clutch means for engaging said lens shifting member with and disengaging it from said lens shifting mechanism;

change-over means for shifting said driven shaft to said engaging position in response to setting for automatic focusing with simultaneous disengaging of said clutch means and for shifting said driven shaft to said disengaging position in response to setting for manual focusing with simultaneous engaging of said clutch means.

2. An interchangeable lens as recited in claim 1, wherein said lens shifting member is composed at least of a lens shifting ring carried to be rotatable about the optical axis and said clutch means engages said lens shifting ring with said lens shifting mechanism when said lens shifting ring is set for manual focusing for transmission of (the torque produced by) rotation of said lens shifting ring about the optical axis to said lens shifting mechanism.

3. An interchangeable lens as recited in claim 2, wherein said change-over means is composed of:

said lens shifting ring carried to be rotatable about the optical axis as well as shiftable along the optical axis between a setting position for automatic focusing and a setting position for manual focusing;

a first means for shifting said driven shaft to said engaging position in response to shifting of said lens shifting ring to said setting position for automatic focusing and for shifting said driven shaft to said disengaging position in response to shifting of said lens shifting ring to said setting position for manual focusing; and a second means for causing said clutch means to disengage said lens shifting ring from said lens shifting mechanism in response to shifting of said lens shifting ring to said setting position for automatic focusing and for causing said clutch means to engage said lens shifting ring with said lens shifting mechanism in response to shifting of said lens shifting ring to said setting position for manual focusing.

4. An interchangeable lens as recited in claim 3, wherein said first means is composed of:

an urging means for urging said driven shaft to said engaging position and a shifting means for shifting said driven shaft to said disengaging position against the urge of said urging means in response to shifting of said lens shifting ring to said setting position for manual focusing and for shifting said driven shaft to said engaging position under the urge of said urging means in response to shifting of said lens shifting ring to said setting position for automatic focusing.

5. An interchangeable lens as recited in claim 3, wherein said driving force transmission means is provided with:

a first transmission member fixedly attached to said driven shaft and a second transmission member connected with said lens shifting mechanism, and said first transmission member and said second transmission member are arranged to be connected with each other when said driven shaft is at said engaging position and at said disengaging position.

6. An interchangeable lens as recited in claim 5, wherein said clutch means is carried to be rotatable about the optical system and to be prevented from shifting along the optical axis and is provided with clutch members connected to be rotatable with said lens shifting ring, and said clutch members are connected with said first transmission member when said driven shaft is at said disengaging position and is disconnected from said first transmission member when said driven shaft is at said engaging position.

7. An interchangeable lens as recited in claim 3, wherein said clutch means is composed of:

a first clutch member fixedly attached to said lens shifting ring and a second clutch member connected with said shifting mechanism, and said first clutch member and said second clutch member are arranged to be engaged with each other when said lens shifting ring is at said setting position for manual focusing and disengaged from each other when said lens shifting ring is at said setting position for automatic focusing.

8. An interchangeable lens as recited in claim 7, wherein said driving force transmission means is composed of:

a first transmission member fixedly attached to said driven shaft and a second transmission member connected with said shifting mechanism and said first transmission member and said second transmission member are arranged to be connected with each other when said driven shaft is at said engaging position and disconnected when said driven shaft is at said disengaging position.

9. A camera equipped with a focusing device for driving a driven shaft of an interchangeable lens for automatically shifting at least one lens of an objective of said interchangeable lens mounted thereon, including:

an electric circuit for focusing;

a driving shaft carried to be rotatable about its axis of rotation along an optical axis and having formed therein a through-hole along said axis of rotation, said driving shaft being engageable with said driven shaft of said interchangeable lens for transmitting a driving force from said focusing device to said driven shaft;

a detection member supported slidably through said through-hole of said driving shaft and urged toward said interchangeable lens, said detection member sliding in said through-hole against the urge according to the relative shifting of said driven shaft to said driving shaft along said optical axis and is shifted to a detecting position when said driven shaft and said driving shaft are engaged with each other; and an opening and closing means for enabling said electric circuit when said detection member has shifted to said detecting position.

10. A camera as recited in claim 9, further comprising a mount positioning means which defines the position of said camera relative to that of said interchangeable lens, wherein said driving shaft and said detection member are disposed in said mount positioning means.

11. A camera as recited in claim 9, wherein said axis of rotation of said driving shaft is disposed to be common with that of said driven shaft, said driving shaft is disposed to be engageable at its front end with the rear end of said driven shaft and when said driving shaft is engaged with said driven shaft, said detection member is directly pushed by the rear end of said driven shaft to be shifted against said urging force to said detecting position.

12. A camera as recited in claim 11, wherein the rear end of said driven shaft is formed therein a hole (with bottom) dimensioned to accommodate the front end of said detection member.

13. A camera as recited in claim 9, further comprising a mount means which comes into contact with a mating mount means of said interchangeable lens, and wherein said detection member has its front end retained at a position retracted from said mount ring with said driven shaft being disengaged from said driving member.

* * * * *

UNITED STATES PATENT OFFICE
CERTIFICATE OF CORRECTION

PATENT NO. : 4,413,894
DATED : November 8, 1983
INVENTOR(S) : Yukio Miki and Takeshi Egawa It is certified that error appears in the above-identified patent and that said Letters Patent are hereby corrected as shown below:

Column 11, line 31: Delete "is composed" and insert --includes--
line 32: Before "a lens" delete "of"
line 40: Delete "is composed" and insert --includes--
line 61: Delete "is composed of" and insert --includes--
Column 12, line 26: Delete "is composed of" and insert --includes--
lines 39 & 40: Delete "is composed of" and insert --includes--
line 48: After "and" and before "disconnected" insert --to be--
Column 14, line 5: After "wherein" and before "the rear" insert --the front end of said detection member is arranged to enter a hole formed in--
lines 6 - 8: Delete "is formed therein a hole (with bottom) dimensioned to accommodate the front end of said detection member"
line 14: Delete "member" and insert --shaft--

Signed and Sealed this

Thirtieth Day of April 1985

[SEAL]

Attest:

DONALD J. QUIGG

Attesting Officer  Acting Commissioner of Patents and Trademarks